(12) United States Patent
Doehler et al.

(10) Patent No.: US 7,727,599 B2
(45) Date of Patent: Jun. 1, 2010

(54) USE OF PARTICULATE EMULSIFIERS IN ABHESIVE SILOXANE-CONTAINING COATING MATERIALS

(75) Inventors: Hardi Doehler, Duesseldorf (DE); Michael Ferenz, Essen (DE); Sascha Herrwerth, Essen (DE); Matthias Naumann, Muelheim (DE); Joachim Venzmer, Essen (DE); Andreas Landgraf, Oberhausen (DE)

(73) Assignee: Goldschmidt GmbH, Essen (DE)

( * ) Notice: Subject to any disclaimer, the term of this patent is extended or adjusted under 35 U.S.C. 154(b) by 292 days.

(21) Appl. No.: 11/849,546

(22) Filed: Sep. 4, 2007

(65) Prior Publication Data

US 2008/0064782 A1 Mar. 13, 2008

(30) Foreign Application Priority Data

Sep. 7, 2006 (DE) .................. 10 2006 041 971

(51) Int. Cl.
  *C09D 7/02* (2006.01)
  *C09D 5/20* (2006.01)
  *C09D 183/07* (2006.01)
(52) U.S. Cl. .................. 427/515; 522/99; 522/83; 522/77; 428/447
(58) Field of Classification Search .................. 522/84, 522/85, 86, 99, 83, 77; 427/515; 428/447
  See application file for complete search history.

(56) References Cited

U.S. PATENT DOCUMENTS

| | | | | |
|---|---|---|---|---|
| 5,034,491 A | | 7/1991 | Wewers et al. | |
| 5,449,716 A | * | 9/1995 | Liles et al. | 524/837 |
| 5,494,979 A | | 2/1996 | Ebbrecht et al. | |
| 6,004,630 A | * | 12/1999 | Sanchez et al. | 427/515 |
| 6,074,747 A | * | 6/2000 | Scholz et al. | 428/352 |
| 6,147,156 A | * | 11/2000 | Yamaya et al. | 524/806 |
| 6,548,568 B1 | * | 4/2003 | Pinto et al. | 522/99 |
| 6,719,932 B2 | * | 4/2004 | Clikeman et al. | 264/4.7 |
| 2005/0266055 A1 | | 12/2005 | Stiller et al. | |
| 2007/0197678 A1 | | 8/2007 | Cavaleiro et al. | |
| 2007/0209552 A1 | | 9/2007 | Gottschalk-Gaudig | |

FOREIGN PATENT DOCUMENTS

| | | |
|---|---|---|
| DE | 3841843 C1 | 2/1990 |
| DE | 102004032842 A1 | 2/2006 |
| DE | 102004039212 A1 | 3/2006 |
| EP | 1820825 A | 8/2007 |
| WO | WO-2004017930 A | 3/2004 |

\* cited by examiner

Primary Examiner—Susan W Berman
(74) Attorney, Agent, or Firm—Frommer Lawrence & Haug LLP

(57) ABSTRACT

The invention relates to a durably homogeneous, low-viscosity, radiation-curable coating material comprising
a) x (meth)acrylated polysiloxanes
and if desired
b) y (meth)acrylated organic compounds
and
c) at least one particulate emulsifier having an average particle size of <1000 nm in at least one dimension,
with the proviso that
$x \geq 1$,
$y \geq 0$,
the sum of $x+y \geq 2$
and the mixture of components a) and b) alone is not durably homogeneous.

13 Claims, No Drawings

USE OF PARTICULATE EMULSIFIERS IN ABHESIVE SILOXANE-CONTAINING COATING MATERIALS

This application claims benefit under 35 U.S.C. 119(a) of German patent application DE 10 2006 041 971.5, filed on 6 Sep. 2006.

Any foregoing applications [including German patent application DE 10 2006 041 971.5, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the invention.

The invention relates to the use of particulate emulsifiers in adhesive siloxane-containing coating materials for the purpose of producing durably homogeneous mixtures of low viscosity.

Adhesive coating materials are widely used to coat sheet-like materials in particular, in order to reduce the tendency of adhering products to adhere to these surfaces.

Adhesive coating materials are used, for example, to coat papers or films which are intended to serve as backings for self-adhesive labels. The labels, provided with a pressure-sensitive adhesive, still adhere sufficiently to the coated surface to allow the handling of the backing sheets bearing the adhesive labels. The adhesion of the adhesive labels to the backing sheets must be sufficiently high to rule out premature detachment of the labels in the course of their machine application, to containers for example, as the backing sheets bearing the labels run over deflecting rollers.

Further application possibilities for adhesive coating materials are packaging papers and packaging films which serve in particular for packaging sticky goods. Adhesive papers or films of this kind are used, for example, to pack foodstuffs or to pack industrial products, such as bitumen, for example.

Further application of adhesive coating materials is in the production of touch-and-close fastenings, as in the case of diapers, for example. If the adhesiveness is too high, the release force hence being too low, the diaper does not stay reliably closed. If the adhesiveness is too low and hence the release force too high, the closure can no longer be opened without the diaper tearing.

In all of the applications the controlled adjustment of the adhesiveness is important for the function of the adhesive coating. This adjustment is made via the mixing of two or more components.

Known on the market since the 1970s have been adhesive coating materials in 100% form, applied without the use of solvents or water. They are able to crosslink as a result of thermally induced reactions. Thermally induced reactions are, typically, catalyzed addition reactions of Si—H groups with vinylic or terminal double bonds.

Since the 1980s there have also been two radiation-curing adhesive coating materials known on the market.

One system, consisting of epoxy-containing silicones, cures under UV radiation by a cationic curing mechanism. This system is described in patents including U.S. Pat. No. 4,421,904, U.S. Pat. No. 4,547,431, U.S. Pat. No. 4,952,657, U.S. Pat. No. 5,217,805, U.S. Pat. No. 5,279,860, U.S. Pat. No. 5,340,898, U.S. Pat. No. 5,360,833, U.S. Pat. No. 5,650,453, U.S. Pat. No. 5,866,261, and U.S. Pat. No. 5,973,020.

The other system cures by a free radical polymerization mechanism following irradiation with UV or electron beams. Systems of this kind are described for example in U.S. Pat. No. 4,201,808, U.S. Pat. No. 4,568,566, U.S. Pat. No. 4,678,846, U.S. Pat. No. 5,494,979, U.S. Pat. No. 5,510,190, U.S. Pat. No. 5,552,506, U.S. Pat. No. 5,804,301, U.S. Pat. No. 5,891,530, and U.S. Pat. No. 5,977,282. Similar polysiloxanes with (meth)acrylic ester groups attached via SiOC groups are described in US 2005/136269.

In systems which cure by a free radical mechanism the polymerizable groups are typically (meth)acrylic ester groups.

In the case of UV crosslinking, photoinitiators are added to the latter organosilicon compounds. Suitable photoinitiators are specified in references including J. P. Fouassier, Polymerization photoinitiators: Excited state process and kinetic aspects, Progress in Organic Coating, 18 (1990) 229-252; J. P. Fouassier, Photo-chemical reactivity of UV radical photoinitiators of polymerisation: A general discussion, Recent Res. Devel. Photochem. & Photobiol., 4 (2000): 51-74; D. Ruhlmann et al., Relations structure-proprietes dans le photo-amorceurs de polymerisation-2. Derives de Phenyl Acetophenone, Eur. Polym. J. Vol. 28, No. 3, pp. 287-292, 1992; and K. K. Dietliker, Chemistry & Technology of UV & EB Formulation for Coatings, Inks & Paints, Volume 3, Sita Technology Ltd., UK; and in US 2004/082681 and U.S. Pat. No. 4,347,111.

In the state of the art, mixtures of two or more (meth)acrylated polysiloxanes having different chain lengths and/or types of modification are used (U.S. Pat. No. 6,268,404, U.S. Pat. No. 6,548,568 to Goldschmidt GmbH, publication "TEGO® RC Silicones, Application Guide", Goldschmidt product data sheets for the products TEGO® RC 902, RC 726, RC 711, RC 708, RC 709, RC 715, and RC 706). A high molecular mass silicone acrylate with a low degree of modification is responsible primarily for the release properties, while highly modified silicone acrylates provide for effective adhesion to the substrate. Furthermore, it is possible to add one or more organic (meth)acrylated compounds, as adhesion components or as reactive diluents, for example, to a (meth)acrylated polysiloxane or to a mixture of two or more such polysiloxanes.

The use of such combinations of (meth)acrylated compounds over the individual components has the advantage, for example, of improved adhesion to the substrate, controlled adjustment of adhesiveness, or a reduction or increase in viscosity.

When combinations of different (meth)acrylated products are used in accordance with the state of the art a problem which occurs is that the components used are usually not durably miscible homogenously. Managing two or more immiscible components, with the attendant need to prepare a mixture shortly before application, is unfavorable or undesirable for the user. In such cases, therefore, it is necessary to prevent the separation of the individual components in order thus to permit a significant simplification in the application of adhesive (meth)acrylated polysiloxanes, through the provision of a durably stable one-component system.

In meeting this need it must be ensured that the homogeneity and stability of the mixtures are not achieved at the expense of a particularly high viscosity. The mixtures ought to exhibit only a low increase in viscosity or else ought to exhibit shear-thinning properties, since the current coating machines are unable to operate satisfactorily with coating materials having a sharply increased viscosity. Coating mechanisms of this kind may be, for example, direct gravure, indirect gravure, flexographic, offset gravure, and multiroll coating mechanisms.

In accordance with the state of the art, special finely divided fillers are added to adhesive coating materials in order to impart improved properties to the release coatings produced using such materials. Fillers used are silicates, talc, particles of silicone resin, polymeric wax particles, PTFE particles, chalk, titanium dioxide, carbonates and the like. Such fillers may fulfill different functions.

They have the function, for example, of lowering the friction coefficient of the release coating produced using them. JP 06-246880 A describes a thermosetting silicone which is admixed with colloidal silica for the purpose of reducing the friction of the release coating produced using it. U.S. Pat. No. 5,942,557 describes the production of a release coating with a low friction coefficient, comprising a cationically UV-curing silicone and fine silicone resin particles.

Fillers are frequently added to adhesive coating materials in order to impart a rough or matt appearance to the coating produced using them. U.S. Pat. No. 4,417,023 describes fillers, such as silicates, talc, and carbonates, in UV-curing, adhesive coating materials, with the aim of reducing the gloss of a coating produced using said materials. Owing to the fact that the silicates, talc or carbonates settle in the mixture, it is proposed that the mixture be stabilized by means of a stabilizer composed of an organically modified siloxane. EP 0 936 973 B1 (U.S. Pat. No. 6,337,116) describes a multilayer composite body consisting of a flexible auxiliary carrier which at least on one side comprises a separation layer that allows the detachment of a functional layer that is in contact with it. The separation layer is constructed from a continuous phase and from a particulate filler, the surface of the filler particles being completely covered by the continuous phase, the continuous phase comprising a crosslinked polyorganosiloxane, and the roughness of the separation layer being not less than a specific level. The objective of that patent is to produce, through the roughness of the separation layer, a roughness in the functional layer that is in contact with it. The aim thereby is to achieve a matting effect in the functional layer.

U.S. Pat. No. 6,231,922 describes the production of unbacked labels having a low gloss, the label comprising a release coating composed of a UV-curing epoxy-functional siloxane, reactive diluents, and a wax-coated silica.

U.S. Pat. No. 6,022,050 describes a cationically UV-curing silicone for production of a release coating, for unbacked labels for example, that for the purpose of adjusting the gloss can comprise a wax-coated silica.

U.S. Pat. No. 6,004,630 describes the production of unbacked labels of low gloss through the addition of polymeric wax particles in UV-curing silicone materials.

WO 2002/018506 (U.S. Pat. No. 6,511,714) describes the use of noncellulosic particles (e.g., talc, silica, kaolin, titanium dioxide) for the purpose of preventing misting during the application of adhesive silicone coatings.

The addition of solids to two immiscible liquid phases for the purpose of stabilizing emulsions is already long-established (see what are known as Pickering emulsions; a review is given in B. P. Binks: Particles as Surfactants—Similarities and Differences, Current Opinion in Colloid & Interface Science 7 (2002) pages 21-41). In that case, however, the emulsions are composed of a very polar phase (e.g., water) and of an apolar phase (e.g., oil), the wetting properties of the solids used with respect to the two liquid phases determining the properties of the solid-stabilized emulsions obtained.

Surprisingly it has been found that through the use of the particulate emulsifiers that are used in accordance with the invention it is possible to impart durable homogenization to coating materials comprising combinations of two or more (meth)acrylated polysiloxanes or combinations of one or more (meth)acrylated polysiloxanes and organic (meth)acrylated compounds which are not compatible with one another and between one another, the coating materials, following introduction of the emulsifiers used in accordance with the invention, experiencing only a small increase in viscosity and/or exhibiting shear-thinning behavior. Following application to sheetlike substrates, and with the aid of coating methods and curing methods in accordance with the state of the art, the coating materials of the invention produce adhesive coatings which, in contrast to the use of noninventive fillers, are not matt.

The invention accordingly provides durably homogeneous, low-viscosity, radiation-curable coating materials comprising a) x (meth)acrylated polysiloxanes and if desired b) y (meth)acrylated organic compounds and c) at least one particulate emulsifier having an average particle size of <1000 nm in at least one dimension, with the proviso that
$x \geq 1$,
$y \geq 0$,
the sum of $x+y \geq 2$ and the mixture of components a) and b) alone is not durably homogeneous.

Durably homogenous in the sense of this invention means that the coating material is stable to sedimentation for at least 14 days when stored at room temperature. A particularly suitable way of quantifying the sedimentation stability is using an analytical centrifuge available under the name Lumifuge from LUM GmbH, Berlin. Using this centrifuge, the sedimentation velocity is measured in µm/s at up to 1200 g, allowing conclusions to be drawn about the settling velocity of 1 g.

Low-viscosity in the sense of the present invention means that the sedimentation-stable mixture, in comparison with the nonstable mixture (i.e., mixtures without particulate emulsifier of the invention), undergoes at most a triplication, more preferably at most a doubling, in both the shear viscosity at rest (i.e., viscosity at a shear rate of $1\ s^{-1}$) and the viscosity at high shear rates ($>1000\ s^{-1}$).

The sedimentation stability of the coating materials of the invention is surprising insofar as, typically, prior-art dispersions that contain solids possess a fairly large droplet size of >1 µm to about 5 µm, which in the case of viscosities that make sense from the application standpoint, of around 500 mPa s to about 2000 mPa s, leads to separation.

The (meth)acrylated polysiloxanes described in the literature recited above, and the respective catalysts and initiators, can also be used in accordance with the invention. The content of the above-recited literature and patent literature on the chemical characterization of siloxane-coating materials and also on the initiators and catalysts that can be used as well is hereby introduced by way of reference and is considered part of the disclosure content of the present application.

Examples of organic (meth)acrylated compounds are, for example, polyether (meth)acrylates, polyester (meth)acrylates, polyurethane (meth)acrylates, epoxy (meth)acrylates, polyfunctional or monoacrylated, fully or partly acrylated alcohols, of the kind available commercially, for example, under the name Laromer® (BASF) or Ebecryl® (Cytec).

The particulate emulsifiers of the invention may either be present as particles or else be agglomerates of primary particles; the size of the particles or agglomerates is <1000 nm, preferably <500 nm, with particular preference<200 nm in at least one dimension. With particular preference the particle size of the particulate emulsifiers is smaller in at least one dimension than the thickness of the adhesive coating, since otherwise there are changes in the visual appearance of the adhesive coatings.

The particulate emulsifiers used in accordance with the invention are used in an amount of 0.1% to 10% by weight, based on total formulation, and with particular preference in an amount of 0.5% to 3% by weight.

Examples of particulate emulsifiers of the invention are hydrophobically modified silicas, silicone resin particles, phyllosilicates, bentonites or metal oxides, such as aluminum oxide, for example, and mixtures thereof.

Finely divided particles of this kind, useful in accordance with the invention, may be either non-structurally modified or structurally modified fumed silicas, or mixtures of both, whose silanol groups have been hydrophobized by surface modification with hydrophobic coating substances or reactants. The hydrophobization is preferably accomplished by treatment with hexamethyldisilazane, polydimethylsiloxane, chlorosilanes, cyclic siloxanes, alkylsilanes, or (meth)acrylated silanes.

Such finely divided particles may additionally be silica sols, as obtainable for example under the name Ludox® from Grace Davison, USA, or silicone resin particles whose surface has been at least partially modified by surfactants, especially cationic surfactants, and/or by reactive silanes.

A feature of the finely divided hydrophobic particles of the invention is that they have much less of an increasing effect on the viscosity of the adhesive coating materials, even at high levels of addition, than do particles which cannot be used in accordance with the invention.

Noninventive additions such as, for example, hydrophilic silicas lead on the one hand to a very pronounced thickening of the (meth)acrylated siloxanes, which hinders application by conventional coating methods. Moreover, these noninventive additions do not produce stable one-component systems.

In contrast to the use of noninventive fillers, the finely divided particulate emulsifiers of the invention have little or no effect on the gloss, roughness, and friction coefficient of the adhesive coating. This effect is very low or even absent at typical film thicknesses of the adhesive coating, and increases at very low film thicknesses.

The particulate emulsifiers of the invention can also be employed together with noninventive fillers. The accompanying use of the finely divided hydrophobic silicas of the invention produces a significant improvement in the stability of the dispersion as compared with the exclusive use of the noninventive fillers.

Furthermore, these permanently homogeneous emulsions/dispersions of the invention can be mixed with further auxiliaries and additives in accordance with the prior art. Particular mention may be made here of photo-initiators, adhesion promoters, curing accelerants, photosensitizers, antioxidants, oxygen scavengers, dyes, pigments or organic compounds containing (meth)acrylic groups or vinyl ether groups.

The invention is further described by the following non-limiting examples which further illustrate the invention, and are not intended, nor should they be interpreted to, limit the scope of the invention.

EXAMPLES

Example 1

70 g of Tego® RC 902 were mixed with 30 g of RC 711 and 3 g of Aerosil R 202 (Degussa, Germany) and also with 2 g of Tego® Photoinitiator A 17 and the mixture was dispersed in a Dispermat at 1000 rpm for 10 minutes at 30° C. This gave a homogeneous, sedimentation-stable emulsion.

Example 2 a) Modification of LUDOX® SM-AS with VARIQUAT® K-300

9.6 g of VARIQUAT® K-300 (75% by weight in IPA) were dissolved in 200 ml of toluene at 60° C. Introduced dropwise into this solution, with stirring, were 100 ml of LUDOX® SM-AS (aqueous dispersion, corresponding to 29 g of $siO_2$). Thereafter the mixture was stirred at this temperature for 15 minutes more. The toluene phase was separated off in a separating funnel and dried using sodium sulfate. The dried toluenic dispersion contained 19.1% by weight of modified particles.

b) Preparation of the RC Emulsion

A 250 ml three-necked flask was charged with 70 g of Tego RC 902, and 20 g of the toluenic particle dispersion, diluted with dry toluene to 5% by weight, and 1.4 g of Tego® Photoinitiator A17 were added. The toluene was distilled off under reduced pressure at 30° C. with stirring using a KPG stirrer. Thereafter 30 g of Tego® RC 711 were mixed with 0.6 g of Tego® Photoinitiator and the mixture was added to the batch. The batch was then stirred for an hour at 30° C. under reduced pressure, using the KPG stirrer, at 600 rpm. This gave a homogeneous, sedimentation-stable emulsion.

Example 3

A 250 ml three-necked flask was charged with 70 g of Tego® RC 902, and 20 g of the toluenic particle dispersion (see example 2), diluted with dry toluene to 5% by weight, and 1.4 g of Tego® Photoinitiator A17 were added. The toluene was distilled off under reduced pressure at 30° C. with stirring using a KPG stirrer. Thereafter 27 g of Tego® RC 711 were mixed with 0.6 g of Tego® Photoinitiator and 3 g of Ebecryl® OTA 480 (Cytec) and the mixture was added to the batch. The batch was then stirred for an hour at 30° C. under reduced pressure, using the KPG stirrer, at 600 rpm. This gave a homogeneous, sedimentation-stable emulsion.

Example 4 a) Modification of LUDOX® SM-AS with ADOGEN 442-100P 8.7 g of ADOGEN® 442-100P were dissolved in 200 ml of toluene at 60° C. Introduced dropwise into this solution, with stirring, were 100 ml of LUDOX® SM-AS (aqueous dispersion, corresponding to 29 g of $SiO_2$). Thereafter the mixture was stirred at this temperature for 15 minutes more. The toluene phase was separated off in a separating funnel and dried using sodium sulfate. The dried toluenic dispersion contained 16.8% by weight of modified particles.

b) Preparation of the RC Emulsion 50 g of Tego® RC 902 were charged to a flask and 29.2 g of the toluenic particle dispersion, diluted with dry toluene to 5% by weight, and 1.0 g of Tego® Photoinitiator A17 were added. The toluene was stripped off on a rotary evaporator at 35° C. In a 50 ml glass beaker, 36 g of this mixture were admixed with 15 g of a solution of 0.3 g of Tego® Photoinitiator A17 in 14.7 g of Tego® RC 711. The mixture was subsequently homogenized on a dissolver at 1000 rpm for 10 minutes. This gave a homogeneous, sedimentation-stable emulsion.

Example 5

In a 250 ml three-necked flask 70 g of Tego® RC 902 were admixed with 10 g of toluene and 4 g of a 50% strength xylenic solution of an amino-functional MQ resin ($M_n$=about 4000 g/mol, w (N)=0.7%) and the mixture was stirred at 50° C. for 30 minutes. Subsequently 30 g of Tego® RC 711 and 2 g of Tego® Photoinitiator A17 were added and at 50° C. the solvent was removed under reduced pressure. This gave a homogeneous, sedimentation-stable emulsion.

Example 6

In a 250 ml three-necked flask 70 g of Tego® RC 902 were admixed with 10 g of toluene and 6 g of a 50% strength xylenic solution of an amino-functional MQ resin ($M_n$=about 4000 g/mol, w (N)=0.7%) and the mixture was stirred at 50° C. for 30 minutes. Subsequently 30 g of Tego® RC 711 and 2 g of Tego® Photoinitiator A17 were added and at 50° C. the solvent was removed under reduced pressure. This gave a homogeneous, sedimentation-stable emulsion.

Example 7

In a 250 ml three-necked flask 70 g of Tego® RC 902 were admixed with 10 g of toluene and 6 g of a 50% strength xylenic solution of an amino-functional MQ resin ($M_n$=about 4500 g/mol, w (N)=1.0%) and the mixture was stirred at 50° C. for 30 minutes. Subsequently 20 g of Tego® RC 711, 10 g of Ebecryl OTA 480, and 2 g of Tego® Photoinitiator A 17 were added and at 50° C. the solvent was removed under reduced pressure. This gave a homogeneous, sedimentation-stable emulsion.

Comparative Example 1

70 g of Tego® RC 902 were mixed with 30 g of RC 711 and 3 g of Aerosil A 200 and also with 2 g of Tego® Photoinitiator A 17 and the mixture was dispersed in a Dispermat at 1000 rpm for 10 minutes at 30° C. This gave a pasty mixture.

Comparative Example 2

70 g of Tego® RC 902 were mixed with 30 g of RC 711 and 3 g of Sipernat 160 and also with 2 g of Tego® Photoinitiator A 17 and the mixture was dispersed in a Dispermat at 1000 rpm for 10 minutes at 30° C. This gave a pasty mixture.

Comparative Example 3

70 g of Tego® RC 902 were mixed with 30 g of RC 711 and also with 2 g of Tego® Photoinitiator A 17 and the mixture was dispersed in a Dispermat at 1000 rpm for 10 minutes at 30° C. This gave a homogeneous emulsion, which after 24 hours has separated completely into two phases.

Performance Testing:

To test the sedimentation stability of the mixtures comprising the solid-state emulsifiers of the invention, an analytical centrifuge available under the name LUMiFuge 116 from L.U.M. GmbH, Berlin is used. For the purpose of testing, the centrifuge tubes (d=1 cm) were filled with 2 ml of the emulsion in question and were centrifuged at a rotational speed of 2000/min at 30° C. for 17 hours. A measurement was then made of the height of the clear supernatant.

In the case of inventive examples 1 to 7 this height was <3 mm; in the case of comparative examples 1 and 2 it was >3 mm.

This shows that the emulsifiers used in accordance with the invention are capable of converting the otherwise incompatible acrylated compounds into a stable emulsion.

The shear viscosity at rest, defined here as the viscosity at a shear rate of $1\ s^{-1}$, and the viscosity at high shear rates were measured using a Physica MCR 301 rheometer from Anton Paar. The measurements were made at 25° C. using a cone/plate geometry (5 cm diameter). The results are given in the table below.

|  | Viscosity at high shear rate ($1000\ s^{-1}$)/mPa s | Shear viscosity at rest/mPa s |
| --- | --- | --- |
| Example 1 | 950 | 1310 |
| Example 2 | 800 | 1100 |
| Example 3 | 820 | 1160 |
| Example 4 | 820 | 1210 |
| Example 5 | 890 | 1300 |
| Example 6 | 910 | 1250 |
| Example 7 | 910 | 1240 |
| Comparative example 1 | 1650 | 5600 |
| Comparative example 2 | 2100 | 4200 |
| Comparative example 3 | 750 | 950 |

The results show that the emulsifiers used in accordance with the invention are capable of emulsifying the otherwise incompatible acrylated compounds, without developing an excessive viscosity.

To test the performance properties of the cured mixtures, the inventive mixtures and also the comparative examples are admixed with the respective photoinitiator and then applied to sheetlike backings (oriented polypropylene film) and cured by exposure to UV light from a state of the art medium-pressure mercury vapor lamp with a UV output of 50 W/cm, with nitrogen blanketing with a controlled residual oxygen content of <50 ppm, at a belt speed of 200 m/min. The application rate in each case is about 1 g/m².

Release Force:

The release forces are determined using a 25 mm wide adhesive tape which has been coated with a rubber adhesive and is available commercially as TESA® 7476 from Beiersdorf.

To measure the adhesiveness, these adhesive tapes are rolled onto the substrate and then stored at 40° C. under a weight of 70 g/cm². After 24 hours a measurement is made of the force required to remove the respective adhesive tape from the substrate at a speed of 30 cm/min and a peel angle of 180°. This force is termed the release force. The general test procedure corresponds essentially to test method 10 of the Federation Internationale des Fabricants et Transformateurs D'Adhésifs et Thermocollants sur Papier et autres Support (FINAT).

Subsequent Adhesion:

The subsequent adhesion is determined very largely in accordance with FINAT test specification 11. For this purpose the adhesive tape TESA® 7475 from Beiersdorf is rolled onto the substrate and then stored at 40° C. under a weight of 70 g/cm$^2$. After 24 hours the adhesive tape is separated from the release substrate and rolled onto a defined substrate (steel plate, glass plate, film). After one minute a measurement is made of the force required to remove the adhesive tape from the substrate at a speed of 30 cm/min and a peel angle of 180°. The resulting measurement is divided by the value for the same measurement on an untreated adhesive tape under otherwise identical test conditions. The result is termed the subsequent adhesion and is expressed in general as a percentage. Figures above 80% are considered by the skilled worker to be sufficient, and suggest effective curing.

Gloss:

The degree of gloss of the coated films and hence the matting effect of the particulate emulsifiers can be evaluated subjectively and compared with comparative example 3.

|  | Release force TESA ® 7476/ cN/in | Subsequent adhesion/% | Gloss in comparison to comparative example 3 |
|---|---|---|---|
| Example 1 | 43 | 92 | equal |
| Example 2 | 48 | 93 | equal |
| Example 3 | 45 | 95 | equal |
| Example 4 | 43 | 92 | equal |
| Example 5 | 42 | 94 | equal |
| Example 6 | 50 | 90 | equal |
| Example 7 | 49 | 90 | equal |
| Comp. example 1 | 60 | 90 | matt |
| Comp. example 2 | 59 | 94 | matt |
| Comp. example 3 | 45 | 92 | — |

The results show that the emulsifiers used in accordance with the invention are capable of producing coatings having a degree of gloss equal to that of comparative example 3. The curing and the release forces of the silicones are unaffected.

Having thus described in detail various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A durably homogeneous, low-viscosity, radiation-curable coating material comprising
   a) x number of different (meth)acrylated polysiloxanes and if desired
   b) y number of (meth)acrylated organic compounds and
   c) at least one particulate emulsifier having an average particle size of <1000 nm in at least one dimension, with the proviso that
   $x \geq 1$,
   $y \geq 0$,
   the sum of $x+y \geq 2$
   and the mixture of components a) and b) alone is not durably homogeneous.

2. The coating material as claimed in claim 1, wherein component c) is selected from the group consisting of finely divided, hydrophobically modified silicas, silicone resin particles, phyllosilicates, bentonites or metal oxides, and mixtures thereof.

3. The coating material as claimed in claim 2, wherein the silicas have been hydrophobized with at least one compound selected from the group consisting of silanes, siloxanes, and quaternary ammonium compounds.

4. The coating material as claimed in claim 1, wherein component c) is structurally modified silicas.

5. The coating material as claimed in claim 1, wherein the particle size of component c) in at least one dimension is <500 nm.

6. The radiation-curable coating material as claimed in claim 1, wherein at least one photoinitiator and/or at least one photosensitizer is included in amounts of 0.1% to 5% by weight, based on the weight of the acrylate-functional silicone materials.

7. The radiation-curable coating material as claimed in claim 1, wherein stabilizers, fillers, pigments and/or further customary additives are included.

8. A method of producing an adhesive coating which comprises of adding the coating material of claim 1 to a coating composition.

9. The method of claim 8, wherein the adhesive coating is a non-matted adhesive coating.

10. A method of coating a surface which comprises of applying the coating material as claimed in claim 1 to a surface.

11. The method of claim 10, wherein the surface is a polymeric film.

12. The method of claim 10, wherein the surface is a porous or absorbent substrate.

13. The method of claim 10, wherein the surface is paper.

* * * * *